United States Patent [19]

Maiocco

[11] 4,327,458
[45] May 4, 1982

[54] DEVICE FOR CONNECTING A WIPER BLADE HOLDER TO A WIPER ARM
[75] Inventor: Guiseppe Maiocco, Rivoli, Italy
[73] Assignee: Arman S.p.A., Druento, Italy
[21] Appl. No.: 176,966
[22] Filed: Aug. 11, 1980
[51] Int. Cl.³ .............................................. B60S 1/40
[52] U.S. Cl. .............................................. 15/250.32
[58] Field of Search ......................... 15/250.32–250.42
[56] References Cited
FOREIGN PATENT DOCUMENTS

| 2128739 | 12/1971 | Fed. Rep. of Germany | 15/250.32 |
| 2801826 | 7/1979 | Fed. Rep. of Germany | 15/250.32 |
| 2377301 | 1/1977 | France | |
| 2019203 | 10/1979 | United Kingdom | 15/250.32 |
| 2036546 | 7/1980 | United Kingdom | 15/250.32 |

Primary Examiner—Peter Feldman
Attorney, Agent, or Firm—Wegner, McCord, Wood & Dalton

[57] ABSTRACT

A connector (19) is provided for connecting a wiper blade (13) to two different type hook-slot wiper arms (1, 2). The connector (19) is comprised of a housing (19A) having two lateral, spaced apart flanks (20) joined together by a cylindrical open sided body (25). The body (25) is shaped to snap over a cross pin of a wiper blade. A lever (26) is connected to the body (25) and extends rearward therefrom with a depending catch (27) and a handle (24) thereon. A pair of catches (29) are formed on the facing surfaces of the flanks (20). A first hook-slot arm (1) engages around the body (25) and raises the lever (26) until the catch (27) snaps into an opening in the arm to lock the arm to the connector (19). The arm is released by raising the handle (24) to lift the lever (26) and the catch (27) whereupon the arm is moved axially relative to the connector (19). A second hook-slot arm (2) is engaged around the body (25) and tilted slightly as a depending wall (11) on the arm rides up the catches (29) to urge the arm against the lever (26) to raise the lever (26) until the wall (11) moves beyond the catches (29) whereupon the arm is then locked to the connector. Both arms (1, 2) prevent the connector (19) from being removed from the blade (13) by blocking removal of the rivet (15) from the body (25) as long as the arm (1, 2) end is assembled around the body (25).

7 Claims, 13 Drawing Figures

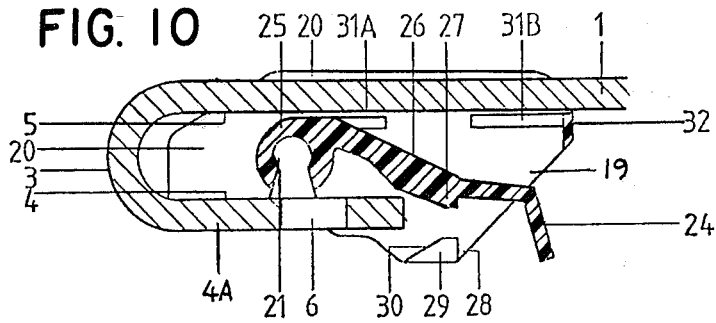
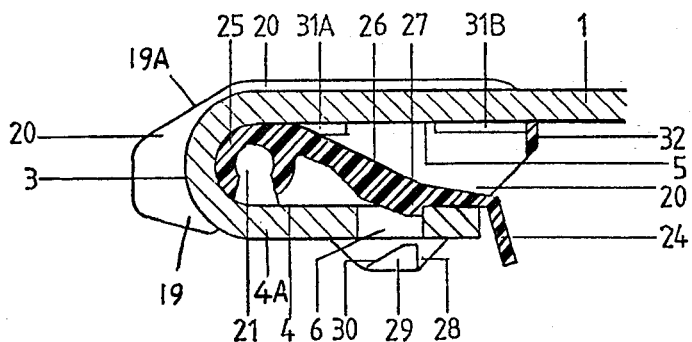
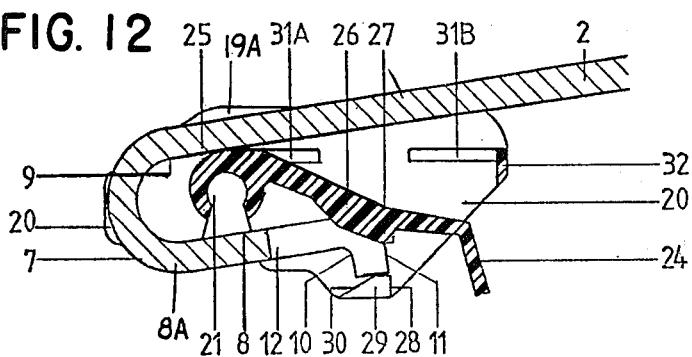
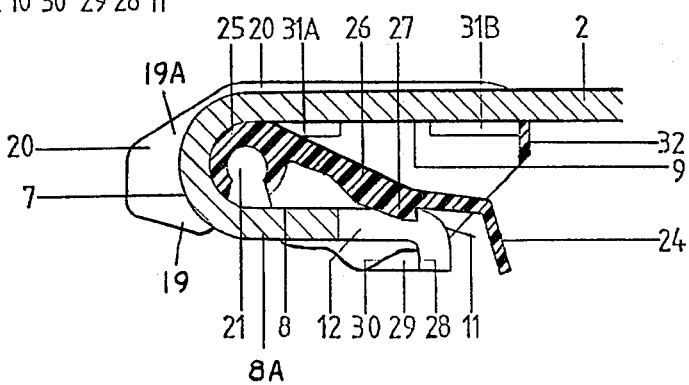

DEVICE FOR CONNECTING A WIPER BLADE HOLDER TO A WIPER ARM

DESCRIPTION

1. Technical field

This invention relates to a connector for connecting a windshield wiper blade to a windshield wiper arm and, more particularly, to a connector for connecting a wiper blade to two different types of hookslot wiper arm ends.

2. Background Art

On the market there are not only a large number of types of wiper blades, but also a large number of wiper arms which all have been designed for a specific type of connection to the wiper blade. The replacement market, i.e. the selling of replacement wiper blades is, therefore, very complex since the connector of a given replacement wiper blade does not necessarily correspond to the type of connection on the wiper arm mounted on the car by the present or previous owner.

The manufacturers of replacement wiper blades have thus been obliged, first to provide their wiper blades with removable or loose connectors and second, to sell with each wiper blade a certain number of different types of connectors, so that the consumer may more easily find a wiper blade which will fit to the wiper arm of his car. However, there are limits to this selling method because the number of loose connectors sold with each wiper blade cannot be infinite. It is, therefore, easy to see that any simplification, i.e. for example any reduction of the number of connectors, must be considered as being an improvement on the present situation.

The present invention is directed to overcoming one or more of the problems as set forth above.

DISCLOSURE OF INVENTION

The present invention makes it possible to use only one loose connector for two different types of wiper arms.

The connector is easily mounted on and removed from, not only the wiper blade, but also from the wiper arm.

The connector is of relatively simple construction, is completely made out of an appropriate plastic material, is easy to mold and, therefore, not very expensive.

Since the connector is an intermediate part between the wiper blade on the one side and the wiper arm on the other side, it necessarily comprises at least two different parts: a first part which must be designed in such a way that the connector may be easily mounted on and removed from the wiper blade holder and a second part which must be designed in such a way that the connector may be easily mounted on and removed from the free end portion of the wiper arm.

The connector according to the invention permits a wiper blade designed for a dorsal fitting to be attached to two different wiper arms of the hook-slot type, the hooks, however, are not identical in shape. For this reason, the connector comprises a device for attachment to the pivot pin or rivet of the wiper blade and has two latching structures for the two hook-slot arms.

The fitting of the connector onto the rivet of the wiper blade may be realized by a known device which permits the snapping of the rivet into a seat provided in the frontal end portion of the connector.

The first latching structure, which serves to attach a first type of hook-slot arm to the connector, comprises a latch which is part of a flexible lever secured to the upper rear portion of the body of the connector, said body surrounding the rivet of the wiper blade and having a substantially cylindrical form. The latch of said flexible lever enters into an opening provided in the curved part of the wiper arm and, in co-operation with the body of the connector, which fits exactly into the hook of the arm, prevents any displacement of said arm with respect to the connector.

The second blocking member which serves to attach a second type of hook-slot arm to the connector comprises two latches which are part of two rigid flanks of the device. The depending wall of this type of wiper arm engages with the latches to raise the lever until the wall moves beyond the latches. Said latches fit into the internal zone below and behind the depending wall and, in co-operation with the body of the connector, which fits exactly into the hook of the arm, prevent any displacement of said arm with respect to the connector.

The connector according to the present invention thus comprises two rigid lateral flanks and a body capable of being snap-fitted onto the rivet of the wiper blade. The body has a substantially cylindrical form opening downwardly. A resilient lever is connected to the central portion of the body and has a first latch structure which, in co-operation with said body, prevents displacement of a first type of hook-slot arm from the connector. The connector also has the rigid lateral flanks provided with second latching structures which, in co-operation with said body of the connector, prevent displacement of a second type of hook-slot arm from the connector.

BRIEF DESCRIPTION OF DRAWINGS

FIG. 10 is a sectional view along line VI—VI of FIG. 5 with the wiper arm of the first type being assembled with the connector;

FIG. 11 is a sectional view along line VI—VI of FIG. 5 with the wiper arm of the first type fully mounted on the connector;

FIG. 12 is a sectional view along line VI—VI of FIG. 5 with the wiper arm of the second type being mounted on the connector; and FIG. 13 is a sectional view along line VI—VI of FIG. 5 with the wiper arm of the second type fully mounted on the connector.

BEST MODE FOR CARRYING OUT THE INVENTION

Figure 1:
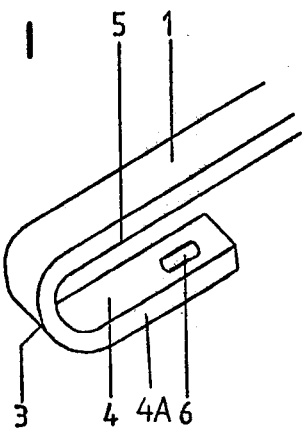
FIG. 1 is a perspective view of the first type of wiper arm.
Figure 2:
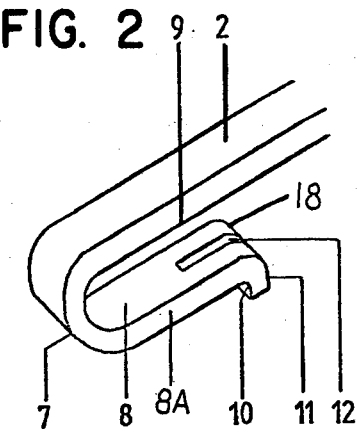
FIG. 2 is a perspective view of the second type of wiper arm.
Figure 3:
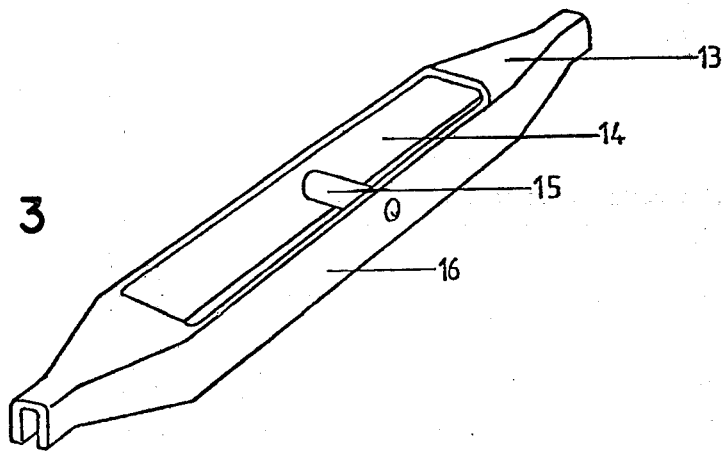
FIG. 3 is a perspective view of the central portion of a wiper blade designed for a dorsal fitting.
Figure 4:
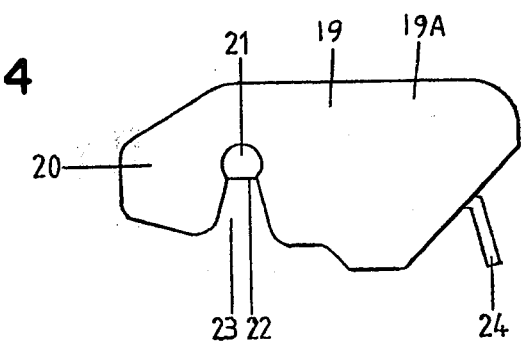
FIG. 4 is an elevational view of the connector or connecting device according to the invention.
Figure 5:
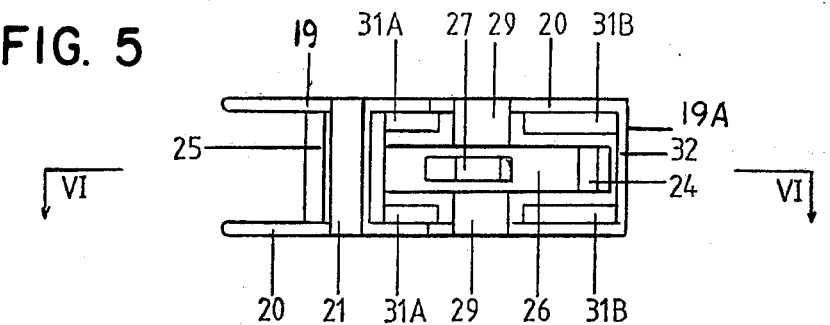
FIG. 5 is a bottom view of the connector according to the invention.

FIGS. 1 to 3 show the elements to be linked together by means of the connector or connecting device 19 according to the invention. In other words, the wiper arms 1, 2 are to be mounted on the wiper blade 13 in such a way that said arms 1, 2 may rotate around the rivet 15 of the wiper blade 13 and that the wiper blade 13 may be easily mounted on and removed from said arms 1,2.

The wiper arm 1 comprises a hook 3 with a lower internal surface 4 on a lower leg 4A, an upper internal surface 5 and a rectangular opening 6 through said lower leg 4A. The wiper arm 2 comprises a hook 7 with a lower internal surface 8 on a lower leg 8A, an upper internal surface 9 and a longitudinal slot 12 in the curved end portion 18 of the lower leg 8A. Moreover, the curved end porton 18 of the hook 7 is provided with a downwardly depending wall 11 which is directed at substantially a right angle downwardly from the straight portion of the lower leg 8A of the wiper arm 2. The wiper blade 13 is provided with a pivot pin or rivet 15 which extends between the spaced walls 16 and is accessible through a substantially rectangular opening 14 at the upper central portion of the blade.

The connector or connecting device 19, according to the invention, is shown in FIGS. 4 to 9. The connector 19 comprises a housing 19A having a pair of substantially parallel side walls or flanks 20 between which a substantially cylindrical open sided body 25 extends. The body 25 is capable of being snap-fitted onto the rivet 15 of the wiper blade 13 by introducing said rivet 15 into the seat 21 through aligned opening 23 formed in the flanks 20. The resilient overhangs or stops 22 at the entrance to the opening 23 prevent accidental disengagement of the rivet 15 from the connector 19.

Figure 6:
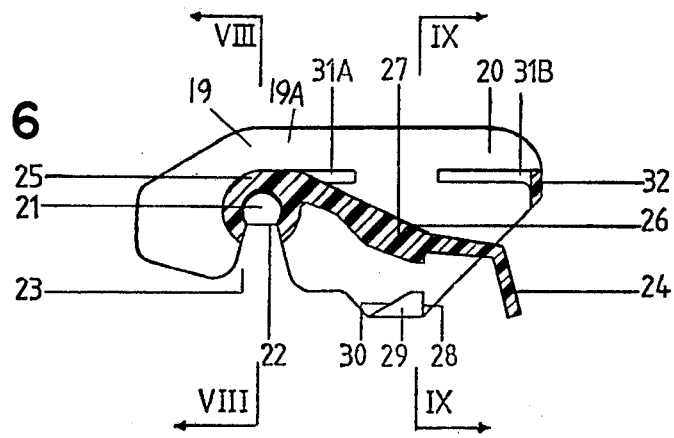
FIG. 6 is a sectional view along line VI—VI of FIG. 5.
Figure 7:
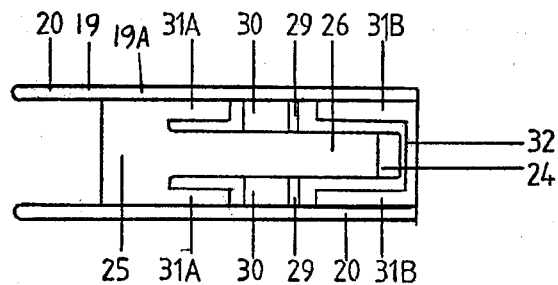
FIG. 7 is a top view of the connector according to the invention.
Figure 8:
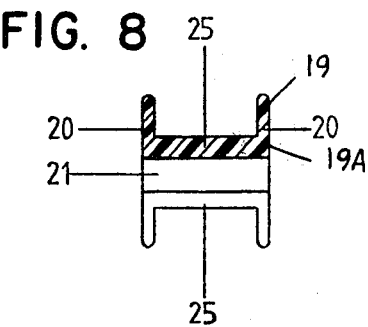
FIG. 8 is a sectional view along line VIII—VIII of FIG. 6.

FIG. 6 shows a flexible release lever 26 of the connector 19 integrally connected to the upper rear portion of the body 25 and extends obliquely downwardly to a depending lug or catch 27 at an intermediate portion thereof and to a downwardly depending release tab or handle 24 at the outer end thereof which extends beyond the confines of the flanks 20 of the housing 19A. The catch 27 enters into the rectangular opening 6 in the intermediate portion of the lower leg 4A of the wiper arm 1, thus locking said wiper arm 1 on the connector 19.

Figure 9:
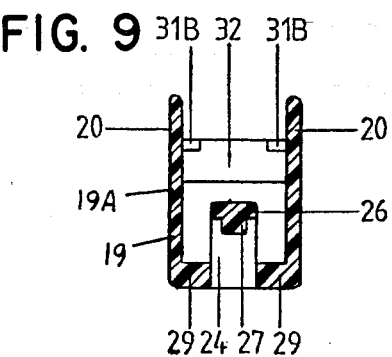
FIG. 9 is a sectional view along line IX—IX of FIG. 6.

The same FIG. 6, as well as FIG. 9, shows each of the rigid spaced apart lateral flanks 20 having a fixed lug or catch 29 on an inner surface thereof. Each lug 29 has a vertical wall 28 on a side of each catch away from the body 25 and has a sloping ramp 30 on the side of each catch closest to the body 15. The walls 11 of wiper arm 2 ride up the ramps 30 and drop beyond the catches 29 with the catches 29 nested into the internal zone 10 of the wiper arm 2, thus completely blocking said wiper arm 2 on the connector 19.

Arm supports 31A and 31B are formed integrally with and project inwardly from the lateral flanks 20 at a height coinciding with the upper surface of the body 25 of the connector 19. These arm supports 31A and 31B act as a guide and as a support to support the two types of wiper arms 1, 2. Lastly the connector 19 is provided with one or more transverse bars 32 extending between the lateral flanks 20 to reinforce the arm supports 31A and 31B and to reinforce the whole connector 19.

The way to mount the wiper arms 1, 2 on the connector 19 is shown in FIGS. 10 to 13.

According to FIG. 10, the body 25 of the connector 19 is snapped over a rivet or pivot pin 15 of a blade whereupon the hook 3 of the wiper arm 1 is drawn over the body 25 of the connector 19. The free end portion of the hook 3 pushes the catch 27, and consequently also the flexible release lever 26, upwards until the catch 27 snaps into the rectangular opening 6 of said hook 3 (FIG. 11). Now the wiper arm 1 is rigidly secured to the connector 19 because the arm 1 rests on the supports 31A, 31B and on the cylindrical body 25 of the device and the release lever 26 exerts a pressure on the internal surface 4 of the hook 3. The lower leg 4A of the arm 1 traps the rivet 15 of the blade in the body 25 so that the arm cannot become disconnected from the blade.

As shown in FIG. 12, the connector 19 is attached to the blade by snapping the body 25 over the rivet 15 in the blade. The wiper arm 2 is then drawn slightly obliquely over the body 25 of the connector 19 in order that the free end portion of the depending wall 11 of arm 2 may pass over the two catches 29 by sliding over the ramps 30. During this operation, the free end portion of the wiper arm 2 pushes the flexible release lever 26 upwards and the catch 27 enters into the longitudinal slot 12 of said arm. It should be noted that the width of the catch 27 is less than the width of the release lever 26.

As soon as the free end portion of the depending wall 11 of the arm 2 has passed the catches 29 (FIG. 13), the walls 28 of the catches 29 drop behind the depending wall 11 and the release lever 26 bears down on the inner surface 8 urging the upper surface 9 against the supports 31A, 31B whereupon the wiper arm 2 is rigidly secured to the connector. The lower leg 8A traps the rivet 15 in the body 25 of the blade to prevent any displacement of said arm 2 from the connector 19 and from the blade.

In order to remove the wiper arm 1 from the connector 19, the handle 24 of the release lever 26 is pushed upwards to release the catches 27 from the opening 6 whereupon the arm can be moved axially relative to the connector 19 to disconnect the arm from the connector. Wiper arm 2 is released by pushing upward on the handle 24 so that the arm end can be rotated about body 25 to lift the depending wall 11 from behind catches 27 whereupon the arm can be moved axially relative to the connector 19 to disconnect the arm 2 from the connector.

It will be understood that the present invention is not limited to the exact construction shown and described, but that various changes and/or modifications may be made without departing from the spirit and scope of the invention as defined in the appended claims.

I claim:

1. A connector (19) for attaching a wiper blade (13) to two different hook-slot wiper arms (1, 2), comprising a housing (19A) having two lateral flanks (20), a body (25) extending between said flanks (20), said body (25) having an opening (23) for snap-fitting onto a rivet (15) of a wiper blade holder, characterized by, (a) a flexible release lever (26) carried by said body (25) and extending obliquely downwards therefrom, a catch means (27) on said release lever (26), said catch means (27) cooperating with said body (25) of the device to prevent displacement of a first type of hook-slot wiper arm (1) from said connector (19), said first catch means (27) is located on the downwardly facing surface of said release lever (26), said first catch means (27) comprising a depending catch (27) which enters into a rectangular opening (6) provided in the curved part of the first type of hook-slot arm (1), said release lever (26) is provided with an actuating handle (24) which extends rearwardly beyond the confines of the two lateral flanks (20) of the device, and (b) second catch means 29 carried by said rigid lateral flanks (20) of said housing (19A), said second catch means (29) cooperating with said body (25) of the device to prevent displacement of a second type of hook-slot wiper arm (2) from said connector (19).

2. A connector (19) according to claim 1, characterized in that said release lever (26) has a width which is less than the width of the body (25) of the device and that said catch means (27) has a width less than the width of said release lever (26).

3. A connector (19) according to claim 1, characterized in that said release lever (26) is secured to the upper portion of the body (25) of the device.

4. A connector (19) according to claim 1, characterized in that said second catch means (29) is located at the lower portion of said rigid lateral flanks (20) and is in the form of a catch (29) on the internal surface of each of said flanks (20), said catches (29) fitting into the internal zone (10) behind the depending wall (11) of the arm (2), said catches (29) are each provided with an oblique surface (30) facing the body (25) of the connector (19), said oblique surfaces (30) guiding the walls (11) of the arm (2) toward the lever (26) to displace the lever (26) until the walls (11) pass the catches to facilitate the mounting of said wiper arm (2) onto the connector (19).

5. A connector (19) according to claim 3, characterized in that support means (31A, 31B) are provided for supporting the wiper arms (1,2), said support means (31A, 31B) being secured to the two lateral flanks (20) and possibly also to the body (25) of the device.

6. A connector (19) according to claim 5, characterized in that at least one transverse bar (32) extends between the two lateral flanks (20) of the housing (19A) for supporting the flanks (20) relative to each other.

7. A connector (19) according to claim 1, characterized in that said device is molded in one piece of an appropriate plastic material.

* * * * *